(12) United States Patent
Van Den Berg et al.

(10) Patent No.: US 7,307,218 B2
(45) Date of Patent: Dec. 11, 2007

(54) ONE-PIECE CABLE ARMOR FERRULE

(75) Inventors: David Charles Van Den Berg, Markleeville, CA (US); Thane Fleming Tahti, Gardnerville, NV (US); Mark Stephen Dieter, Gardnerville, NV (US)

(73) Assignee: General Electric Company, Schenectady, NY (US)

( * ) Notice: Subject to any disclaimer, the term of this patent is extended or adjusted under 35 U.S.C. 154(b) by 222 days.

(21) Appl. No.: 11/165,063

(22) Filed: Jun. 24, 2005

(65) Prior Publication Data

US 2006/0288542 A1    Dec. 28, 2006

(51) Int. Cl.
*H02G 15/02*    (2006.01)
(52) U.S. Cl. ..................... 174/74 R; 174/78
(58) Field of Classification Search ............. 174/74 R, 174/75 C, 78, 81, 82
See application file for complete search history.

(56) References Cited

U.S. PATENT DOCUMENTS

| | | | | |
|---|---|---|---|---|
| 1,808,542 | A * | 6/1931 | Ginsburg | 174/83 |
| 2,762,994 | A * | 9/1956 | Kennelly | 362/35 |
| 3,227,803 | A * | 1/1966 | Gohs | 174/78 |
| 3,492,410 | A * | 1/1970 | Kelly | 174/78 |
| 3,603,912 | A * | 9/1971 | Kelly | 439/273 |
| 3,647,934 | A * | 3/1972 | Hurtt | 174/652 |
| 3,915,479 | A * | 10/1975 | Sotolongo | 285/149.1 |
| 4,090,029 | A * | 5/1978 | Lundeberg | 174/51 |
| 4,468,535 | A * | 8/1984 | Law | 174/669 |
| 4,549,038 | A * | 10/1985 | Masheris et al. | 174/655 |
| 5,670,747 | A | 9/1997 | Lawer et al. | |
| 5,750,930 | A | 5/1998 | Buck et al. | |
| 5,929,383 | A * | 7/1999 | Marik et al. | 174/78 |
| 6,262,374 | B1 * | 7/2001 | Matsumoto et al. | 174/74 R |
| 6,354,851 | B1 | 3/2002 | Bachle | |

* cited by examiner

*Primary Examiner*—William H. Mayo, III
(74) *Attorney, Agent, or Firm*—Nixon & Vanderhye, PC

(57) ABSTRACT

A metal cable armor ferrule includes an outer cylindrical portion and an inner cylindrical portion connected at one end by a radial edge surface, wherein at least the outer cylindrical portion is flared outwardly at an opposite end thereof.

7 Claims, 3 Drawing Sheets

ONE-PIECE CABLE ARMOR FERRULE

BACKGROUND OF THE INVENTION

This invention relates to cable hardware and specifically, to a one-piece cable armor ferrule.

Certain cable armor terminations or ferrules are of two-piece design. These have proven to be unsafe in that assemblers have been injured trying to install the two-piece design, particularly with very small cables. In addition, they are time-consuming to install and relatively expensive.

BRIEF DESCRIPTION OF THE INVENTION

The present invention provides a solution to the above-mentioned problems with two-piece ferrule designs. In the exemplary embodiment, a one-piece ferrule includes an inner cylindrical portion and an outer cylindrical portion connected by a radial edge surface. The inner cylindrical portion is designed to be inserted into the inner diameter of the cable armor while the radial edge surface and outer cylindrical portion wrap around the end and over the outer diameter of the cable armor. Both the inner and outer cylindrical portions are flared at their free ends to facilitate sliding over the ends of the cable and cable armor. The outer cylindrical portion has a shorter axial length than the inner cylindrical portion and is adapted to be secured to the cable armor by any suitable means such as crimping, deforming, staking, welding, etc.

It will be appreciated that the size and dimensions disclosed herein are specific to the particular cable armor to which the ferrule will be applied. The ferrule design can easily be resized to fit armors of different dimensions, with or without armor jacketing.

Accordingly, in one aspect, the present invention relates to a metal cable armor ferrule comprising an outer cylindrical portion and an inner cylindrical portion connected at one end by a radial edge surface, wherein at least the outer cylindrical portion is flared outwardly at an opposite end thereof.

In another aspect, the present invention relates to a metal cable armor ferrule comprising an outer cylindrical portion and an inner cylindrical portion connected at one end by a radial edge surface; wherein at least the outer cylindrical portion is flared outwardly at an opposite end thereof; wherein the inner cylindrical portion is flared outwardly at an opposite end thereof; and wherein the inner cylindrical portion has an axial length substantially two times an axial length of the outer cylindrical portion.

In still another aspect, the present invention relates to a cable assembly comprising a cable, a cable armor surrounding the cable, and a one-piece armor termination ferrule having an outer cylindrical portion fixed to the cable armor and an inner cylindrical portion through which the cable passes, the outer and inner cylindrical portions connected by a radial surface covering a terminal edge of the cable armor.

The invention will now be described in detail in connection with the drawings identified below.

BRIEF DESCRIPTION OF THE DRAWINGS

FIG. 5 is a partial perspective view of the ferrule of FIGS. 1-4 attached to the cable armor with a cable passing through.

DETAILED DESCRIPTION OF THE INVENTION

Figure 1:
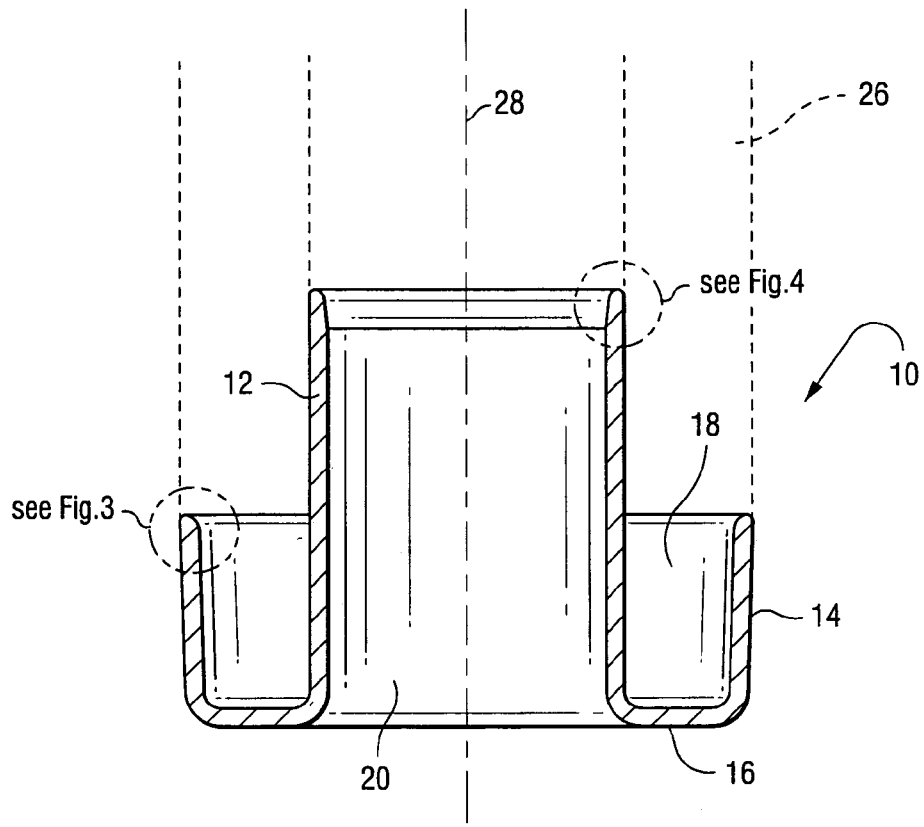
FIG. 1 is a cross section through a cable armor ferrule in accordance with an exemplary embodiment of the invention taken along the line 1-1 in FIG. 2.
Figure 2:
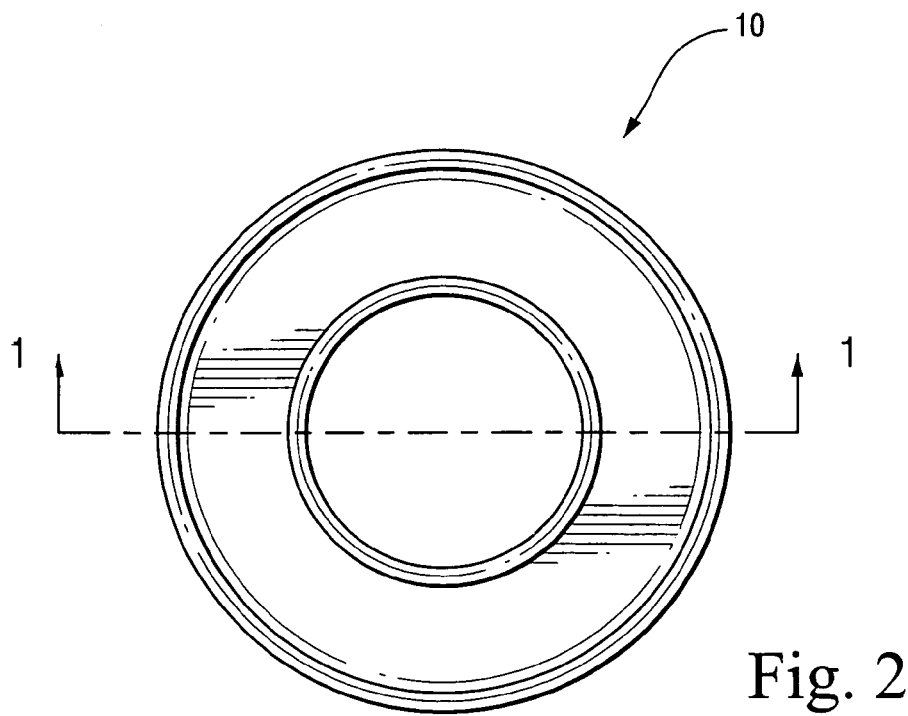
FIG. 2 is a plan view of the ferrule shown in FIG. 1.

With reference initially to FIG. 1, the ferrule 10 in accordance with an exemplary embodiment of the invention includes an inner cylindrical portion 12 and an outer cylindrical portion 14 connected by an annular radial edge surface 16. The radial edge surface 16 establishes an annular space or gap 18 between the inner and outer cylindrical portions 12, 14, respectively, which is adapted to receive one end, including a terminal edge of a cylindrical cable armor indicated at 26. The radial edge surface 16 also protects the terminated end of the cable armor as well as the hands of the ferrule installer from the otherwise raw terminal edge of the armor.

In the exemplary embodiment, the outer cylindrical portion has an axial length of approximately 0.12 in., while the inner cylindrical portion has an axial length of approximately 0.26 in. or about twice the axial length of the outer portion. The diameter of the inner cylindrical portion may be about 0.181-0.185 in. while the diameter of the outer cylindrical portion may be 0.303-0.308 in. The dimensions, of course, will vary with cable diameter and armor thicknesses.

Figure 3:
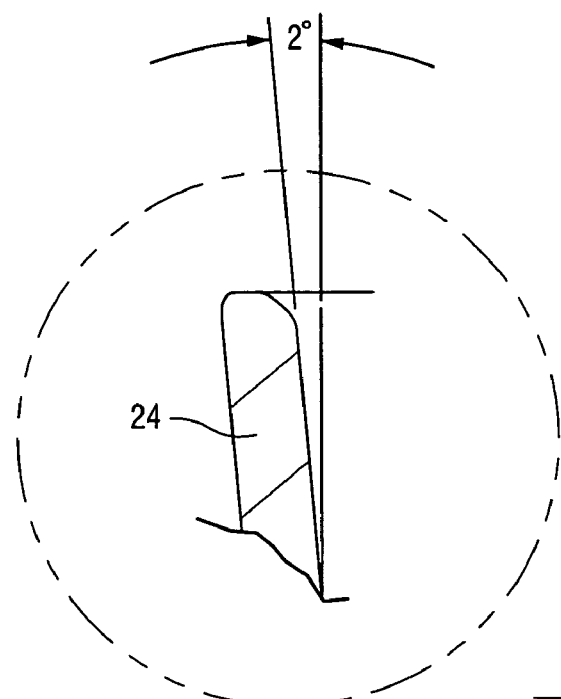
FIG. 3 is an enlarged detail taken from the outer cylindrical portion in FIG. 1.
Figure 4:
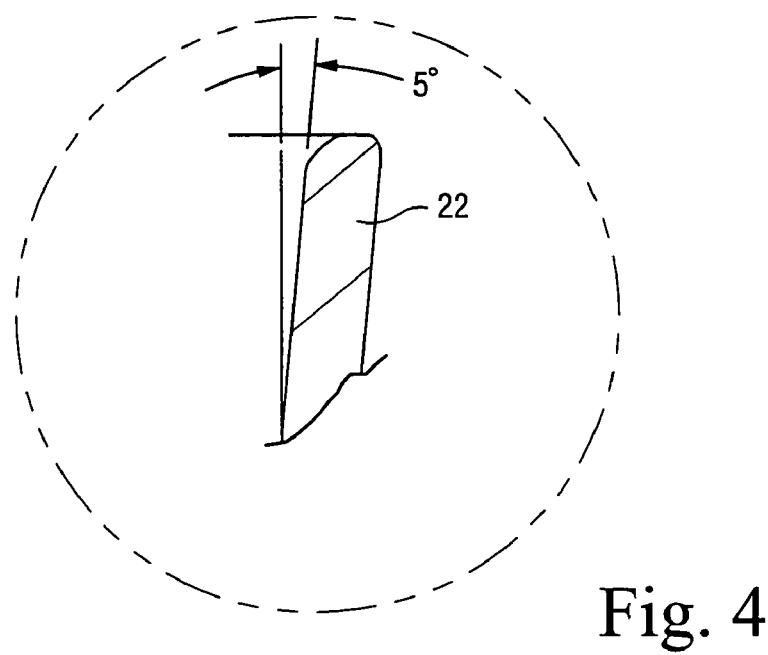
FIG. 4 is an enlarged detail taken from the inner cylindrical portion of the ferrule shown in FIG. 1.

With reference to both FIGS. 3 and 4, the trailing or free ends of both inner and outer cylindrical portions are flared. Specifically, and with reference to FIG. 4, the trailing end of the inner cylindrical portion 12 is flared at 22 approximately 5° relative to the longitudinal center axis 28 of the ferrule. At the same time, the outer cylindrical portion 14 is flared at 24 at an angle of about 2° relative to the same axis. The flared end portions facilitate sliding of the ferrule over the cable armor 26 and also facilitate passage of the cable itself through the cylindrical opening 20 in the ferrule 10.

Figure 5:
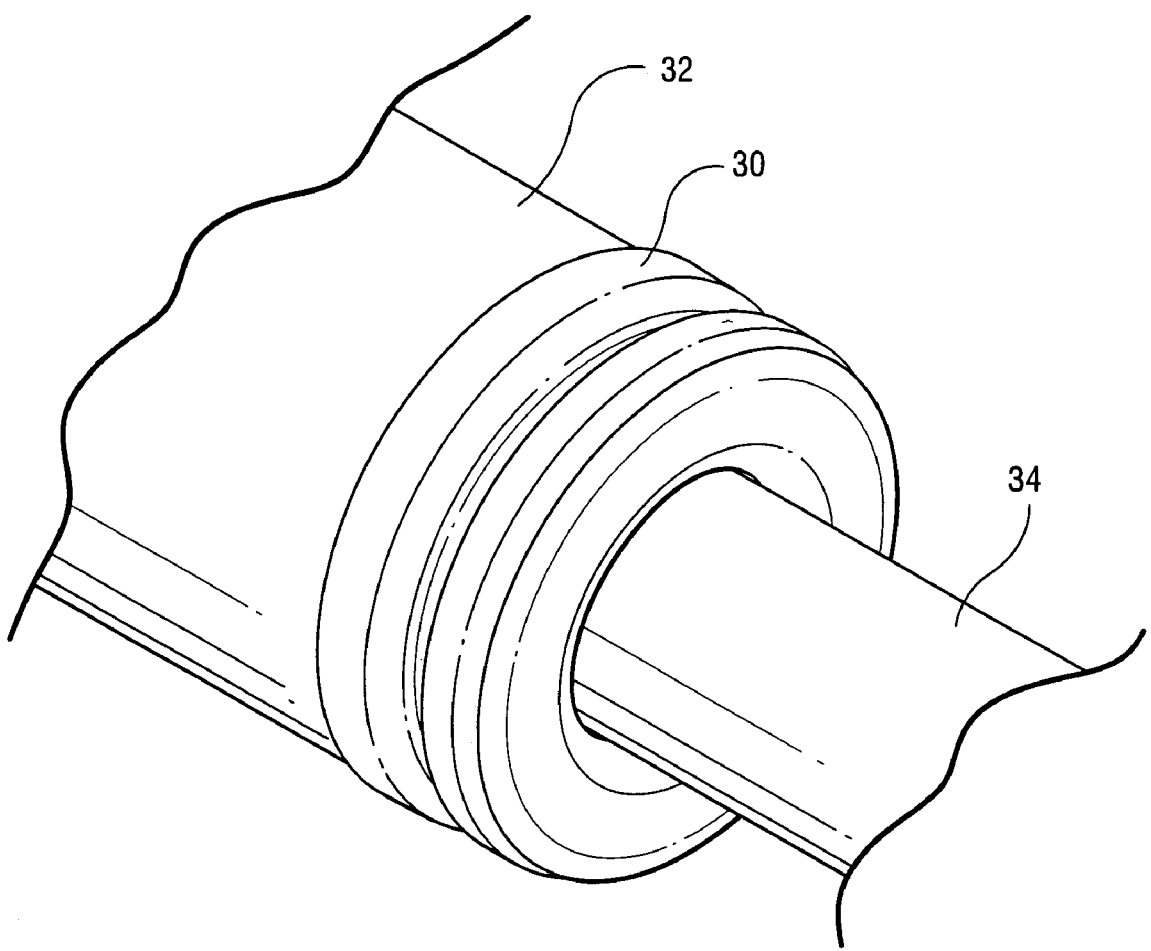

The ferrule 10 may be constructed of a suitable metal, such as stainless steel or other suitable material, e.g., copper, aluminum, brass, plastic, etc. In this regard, it will also be appreciated that the armor ferrule 10 may be secured to the cable armor 26 by any suitable conventional means, including crimping, deforming, staking or welding. A crimped ferrule 30 is shown attached to cable armor 32 in FIG. 5. Cable 34 extends beyond the ferrule 30 to a cable termination, connector or the like.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A metal cable armor ferrule comprising an outer cylindrical portion and an inner cylindrical portion connected at one end by a radial edge surface, wherein said outer cylindrical portion is flared outwardly at an opposite end thereof at an angle of about 2° and wherein said inner cylindrical portion is also flared outwardly at an opposite end thereof at an angle of about 5°, relative to a longitudinal axis of the ferrule.

2. The metal cable armor ferrule of claim 1 wherein said inner cylindrical portion has an axial length substantially two times an axial length of said outer cylindrical portion.

3. The metal cable armor ferrule of claim 1 wherein said radial edge surface has a width of about 0.181 in.

4. The metal cable armor ferrule of claim 1 wherein the ferrule is constructed of stainless steel.

5. A cable assembly comprising a cable, a cable armor surrounding said cable, and a one-piece armor termination ferrule having an outer cylindrical portion fixed to said cable armor and an inner cylindrical portion through which said cable passes, said outer and inner cylindrical portions connected by a radial surface covering a terminal edge of said cable armor, wherein free ends of said outer and inner cylindrical portions are flared outwardly at angles of substantially 2° and 5°, respectively.

6. The cable assembly of claim 5 wherein said inner cylindrical portion has an axial length substantially two times an axial length of said outer cylindrical portion.

7. The cable assembly of claim 5 wherein the ferrule is constructed of stainless steel.

* * * * *